(12) United States Patent
Wilson et al.

(10) Patent No.: US 10,494,101 B2
(45) Date of Patent: Dec. 3, 2019

(54) PASSENGER SEAT PRIVACY HEADREST

(71) Applicant: Rockwell Collins, Inc., Cedar Rapids, IA (US)

(72) Inventors: Cody Wilson, Winston-Salem, NC (US); David Poole, Winston-Salem, NC (US); Michael Kreitz, III, High Point, NC (US); John Liptrap, Pilot Mountain, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1 day.

(21) Appl. No.: 15/684,843

(22) Filed: Aug. 23, 2017

(65) Prior Publication Data

US 2019/0061955 A1    Feb. 28, 2019

(51) Int. Cl.
  *B64D 11/06*    (2006.01)
  *B60N 2/809*    (2018.01)
  *B60N 2/879*    (2018.01)

(52) U.S. Cl.
  CPC .......... *B64D 11/0642* (2014.12); *B60N 2/809* (2018.02); *B60N 2/879* (2018.02); *B64D 11/0646* (2014.12)

(58) Field of Classification Search
  CPC .......... B64D 11/0642; B64D 11/0646; B60N 2/879; B60N 2/809; B60N 2/806; B60N 2/865; B60N 2/885
  See application file for complete search history.

(56) References Cited

U.S. PATENT DOCUMENTS

| | | | | |
|---|---|---|---|---|
| 4,205,878 A | * | 6/1980 | Wooten | B60N 2/99 297/391 |
| 4,440,443 A | | 4/1984 | Nordskog | |
| 5,370,446 A | * | 12/1994 | Bancod | A47C 7/38 297/408 |
| 5,904,405 A | * | 5/1999 | Wu | B60N 2/885 297/391 |
| 6,120,099 A | * | 9/2000 | Reikerås | B60N 2/809 297/391 |
| 6,513,871 B2 | * | 2/2003 | Bartels | B60N 2/885 297/216.12 |

(Continued)

FOREIGN PATENT DOCUMENTS

| | | |
|---|---|---|
| WO | 2013144622 | 10/2013 |
| WO | 2015191709 | 12/2015 |
| WO | 2016161080 | 10/2016 |

*Primary Examiner* — Philip F Gabler
(74) *Attorney, Agent, or Firm* — Clements Bernard Walker

(57) ABSTRACT

In an illustrative embodiment, a privacy headrest assembly is configured to provide privacy to a passenger in an aircraft passenger seat, including a headrest mount portion having at least one attachment assembly configured to secure the privacy headrest assembly to at least one of a headrest and a seat frame of the passenger seat, and a privacy extension portion including a privacy shield slideably connected to at least one shell member, where the privacy shield is configured to deploy in a forward direction from a stowed position to an operational position, where, in the stowed position, the privacy shield is substantially enclosed within the at least one shell member, and, in the operational position, the privacy shield is disposed between a head of a passenger of the passenger seat and a head of another passenger in an adjacent passenger seat.

10 Claims, 16 Drawing Sheets

(56) References Cited

U.S. PATENT DOCUMENTS

| | | | |
|---|---|---|---|
| 6,644,736 B2 | 11/2003 | Nguyen et al. | |
| 6,744,898 B1 | 6/2004 | Hirano | |
| 7,568,759 B2 * | 8/2009 | Schurg | B64D 11/06 297/184.1 |
| 7,641,278 B2 * | 1/2010 | Strasser | B64D 11/06 244/118.6 |
| 8,950,813 B2 * | 2/2015 | Nawaz | B60N 2/806 297/406 |
| 9,216,665 B2 | 12/2015 | Herault | |
| 9,266,613 B2 | 2/2016 | Henshaw et al. | |
| 9,481,277 B1 * | 11/2016 | Ruelas | B60N 2/885 |
| 9,567,085 B2 | 2/2017 | Suzuki et al. | |
| 9,956,898 B1 * | 5/2018 | Dellock | B60N 2/90 |
| 2004/0004382 A1 | 1/2004 | Dowty | |
| 2004/0007910 A1 | 1/2004 | Skelly | |
| 2005/0121963 A1 | 6/2005 | Williamson et al. | |
| 2005/0194827 A1 | 9/2005 | Dowty et al. | |
| 2015/0329025 A1 * | 11/2015 | Szczygiel | B60N 2/885 297/391 |
| 2016/0130003 A1 | 5/2016 | Arriola et al. | |
| 2017/0015420 A1 | 1/2017 | Henshaw et al. | |

* cited by examiner ent of privacy to the passenger, because reduced additional testing would be required. Additionally, add-on privacy apparatus could be readily deployed among a variety of existing passenger seating installations.

PASSENGER SEAT PRIVACY HEADREST

BACKGROUND

The present disclosure relates to a headrest mounted or headrest region privacy assembly for a passenger seat on an aircraft, a train, a bus or other form of transportation. Passenger seats in close proximity have limited privacy from each other. Passengers seated next to one another may prefer an element of privacy from another passenger or other distractions within a cabin. Further, some passengers would appreciate greater light blockage from nearby passengers working with lighted electronic devices or reading lights. New developments in seating apparatus must comply with requirements for ingress and egress of passengers as well as for crash safety measures and other statutory requirements. Add-on privacy apparatus compatible with existing seat frames would be advantageous over requiring a custom seat frame in providing an element of privacy to the passenger, because reduced additional testing would be required. Additionally, add-on privacy apparatus could be readily deployed among a variety of existing passenger seating installations.

SUMMARY OF ILLUSTRATIVE EMBODIMENTS

The forgoing general description of the illustrative implementations and the following detailed description thereof are merely exemplary aspects of the teachings of this disclosure, and are not restrictive.

In an illustrative embodiment, a privacy headrest assembly is configured to provide privacy to a passenger seated in an aircraft passenger seat through use of a privacy extension mounted to or proximate the passenger seat head rest. For example, privacy headrest assembly may include a headrest mount portion having at least one attachment assembly configured to secure the privacy headrest assembly to a seat frame of the passenger seat, a privacy extension portion including a privacy screen, and a connecting portion for connecting the headrest mount portion to the privacy extension portion.

In an illustrative embodiment, the privacy extension portion includes a first shell, a second shell, at least one track configured to form a gap between the first shell and the second shell, and a sliding rigid shield configured to slide into and out the gap between the first shell and the second shell.

In an illustrative embodiment, the at least one track includes a horizontal rail positioned along the privacy extension portion and configured to support and guide the sliding rigid shield.

In an illustrative embodiment, the privacy shield is retractable into the connecting portion and at least a portion of the headrest mount portion.

In an illustrative embodiment, the privacy shield is configured to extend from the connecting portion.

In an illustrative embodiment, the privacy shield is configured to rotate into and out of the privacy extension portion.

In an illustrative embodiment, the privacy headrest assembly further includes a vertical rail configured to connect the privacy extension portion to the connecting portion; where the privacy extension portion is to configured to move vertically from the connecting portion.

In an illustrative embodiment, a privacy headrest assembly configured to provide privacy to a passenger seat includes a privacy extension portion including a retractable privacy shield; and a connecting portion having at least one attachment assembly configured to secure the privacy headrest assembly to a seat frame of the passenger seat.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
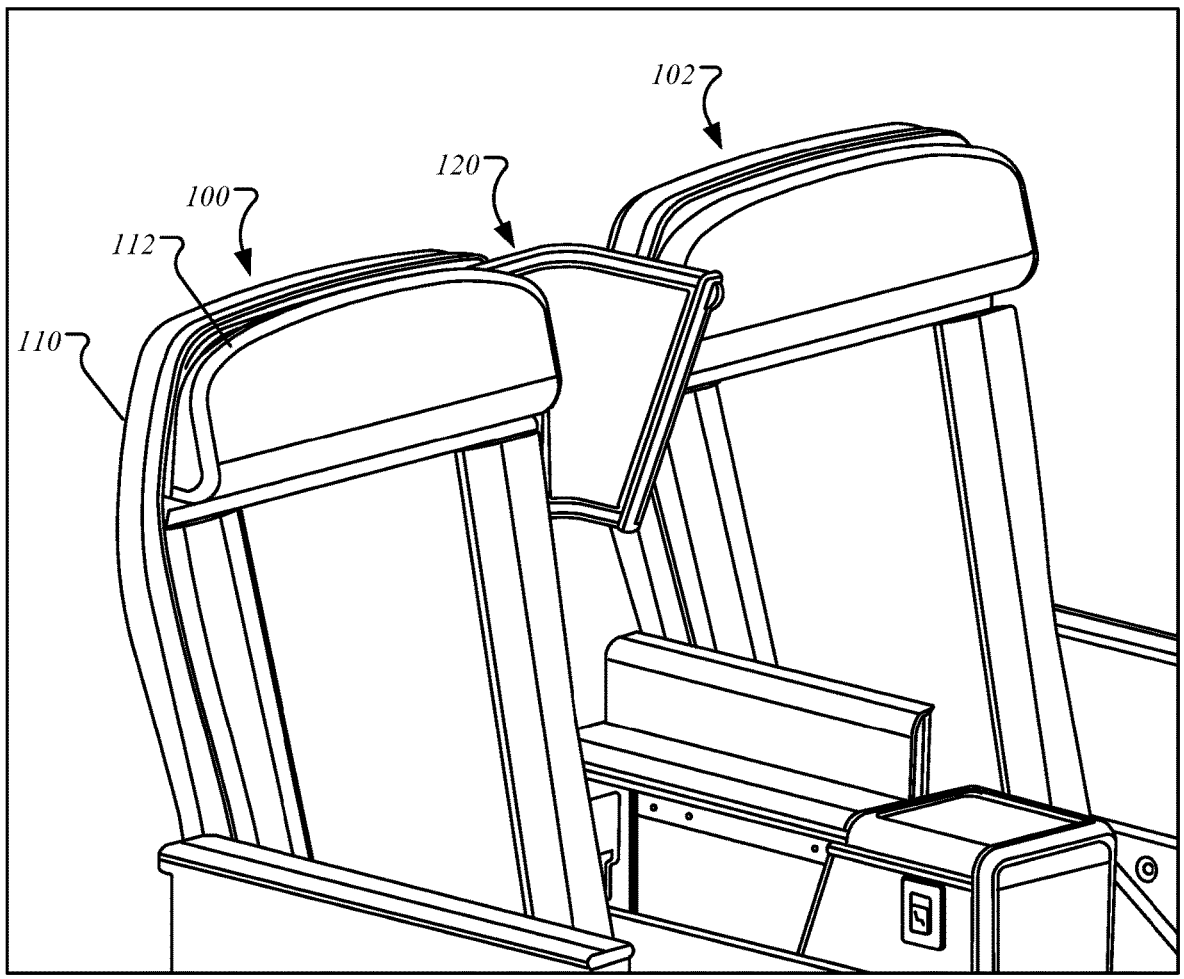
FIG. 1A is a perspective view of a passenger seat having a privacy headrest assembly configured to provide an element of privacy from an adjacent passenger seat according to an example.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

The present disclosure relates to a privacy headrest assembly for a passenger seat. In some implementations, the privacy headrest assembly can be used to block light from a window, a neighboring passenger's electronic device, or an aisle region. In an example, a seated passenger may deploy a shield from the privacy headrest assembly to block light from a window positioned next to an adjacent seat or in an opposite row across an aisle. The privacy headrest assembly, in some implementations, is deployable to shield view to a passenger seated in the passenger seat from others nearby. For example, a passenger may deploy one or more privacy shields to block other passengers' view during napping. In further implementations, a passenger suffering from coughing or sneezing may deploy a privacy shield to block transfer of germs to nearby passengers. In some implementations, the privacy headrest assembly can be used to provide privacy for a mother nursing an infant. In an example, the privacy headrest assembly can be raised or lowered to cover a lower portion of a passenger such as a chest area allowing privacy for the nursing mother. In an aspect, each exposed surface of the privacy headrest assembly is configured to comply with FAA and FDA requirements for flammability and cleaning. In an aspect, the privacy shield is configured to be securely in position in regardless of turbulence and rough landings.

Figure 1B:
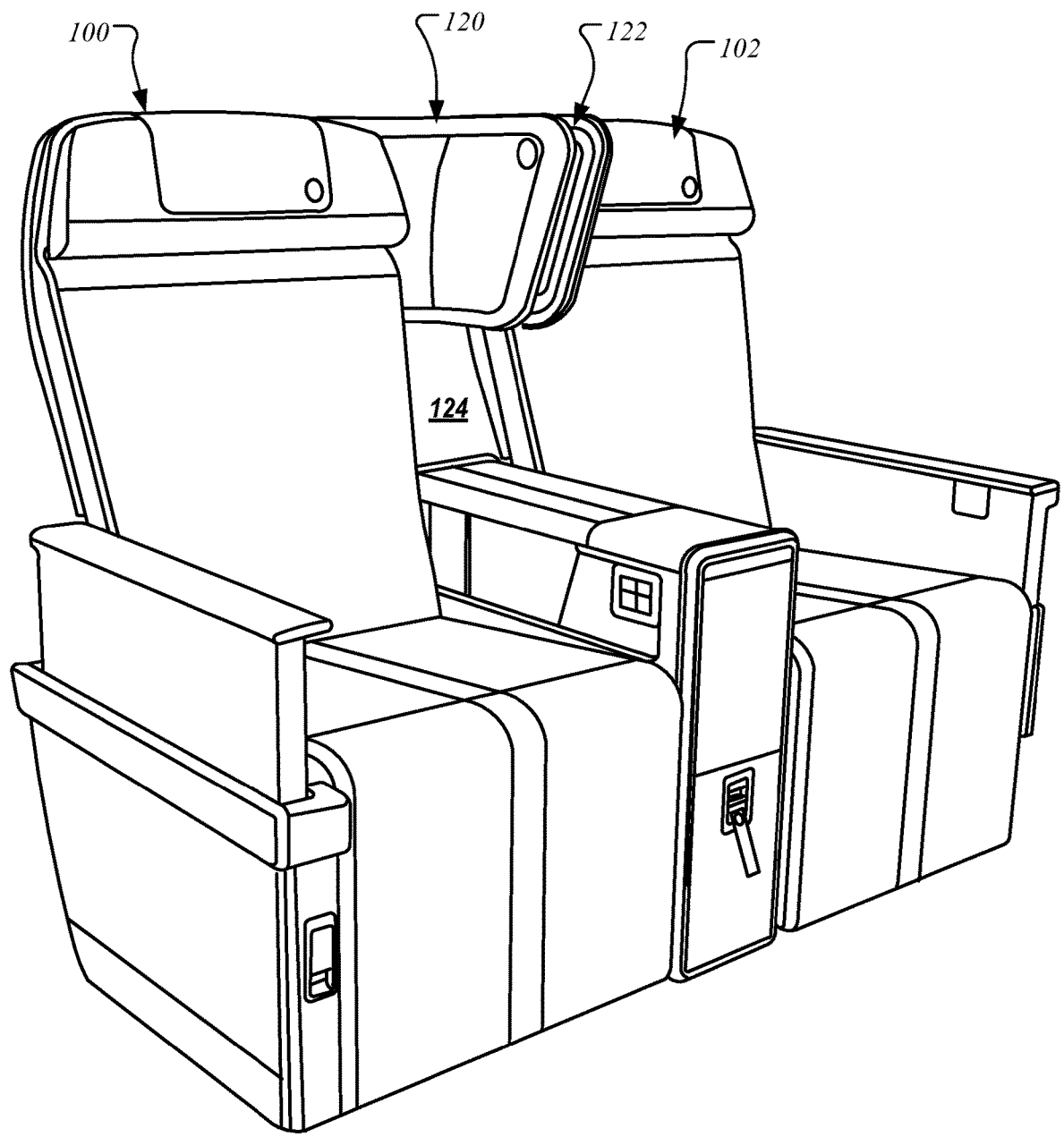
FIG. 1B is a perspective view of a pair of passenger seats with each seat having a privacy headrest assembly according to an example.

As shown in FIG. 1A, a passenger seat 100 can have a privacy headrest extension 120 configured to provide privacy from an adjacent seat 102 according to an example. In some examples, the privacy headrest assembly 120 can be connected to a seat frame 110 and/or a headrest cushion 112 of a seat 100. In other embodiments, the privacy headrest assembly 120 is built into a headrest portion of a passenger seat. As shown in FIG. 1B, the adjacent seat 102 can have a complementary privacy headrest extension 122 according to an example.

Each privacy headrest extension 120, 122, in some embodiments, is forward-deployable from a stowed position proximate the head cushion 112 of the respective seat 100, 102 to a deployed position substantially between adjacent passenger seats. For example, the privacy headrest extension may include a privacy shield extendable from a stowed position to a deployed position.

In some implementations, the privacy headrest extension 120, 122 is mounted to the respective seat 100, 102. In other implementations, the privacy headrest extension 120, 122 is mounted to a fixed shell extending behind the two seats 100, 102. For example, as illustrated in FIG. 1B, a fixed shell 124 extends behind the seats 100, 102.

In some implementations, one or more passenger seats within a passenger seating group includes a set of privacy headrest extensions. For example, an aisle-positioned passenger seat may include two privacy headrest extensions to block light and/or visibility from each side of the seated passenger (e.g., both the aisle side and the side of an adjacent passenger. However, a window-positioned passenger seat may include only one privacy headrest extension since the passenger already enjoys a level of privacy/lighting control from the window side due to proximity to the wall of the aircraft cabin. In other embodiments, a window side privacy headrest extension may be desirable to block lighting from an aft-positioned passenger's window (e.g., to reduce glare on a screen or to aid in napping). In the event of dual privacy screens, design of the privacy screen may differ based upon positioning. For example, an aisle-mounted privacy headrest extension may have greater clearance of movement than an interior privacy headrest extension (e.g., due to proximity of a neighboring passenger). Further, aisle-mounted and/or interior-mounted privacy headrest extensions may be limited in extension and/or breadth based upon factors, in some examples, such as cabin attendant accessibility to other passengers within the seating group or clearance requirements for passenger exit into the aisle area.

Figure 2A:
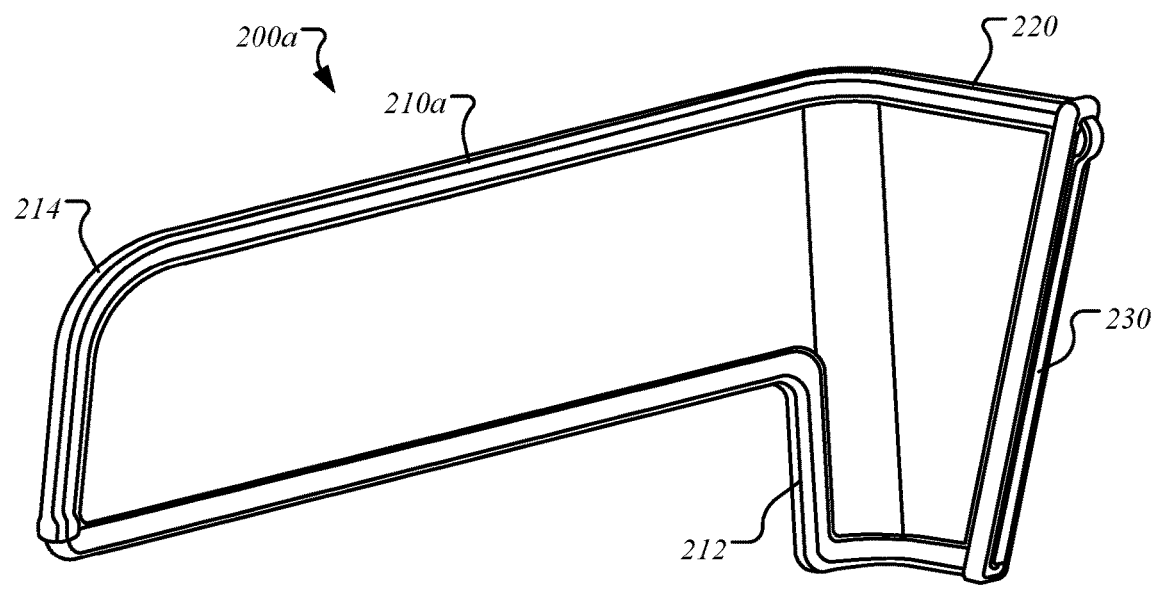
FIG. 2A is a front perspective view of a privacy headrest assembly having a headrest mount portion, a connecting portion, and a privacy extension portion according to an example.
Figure 2B:
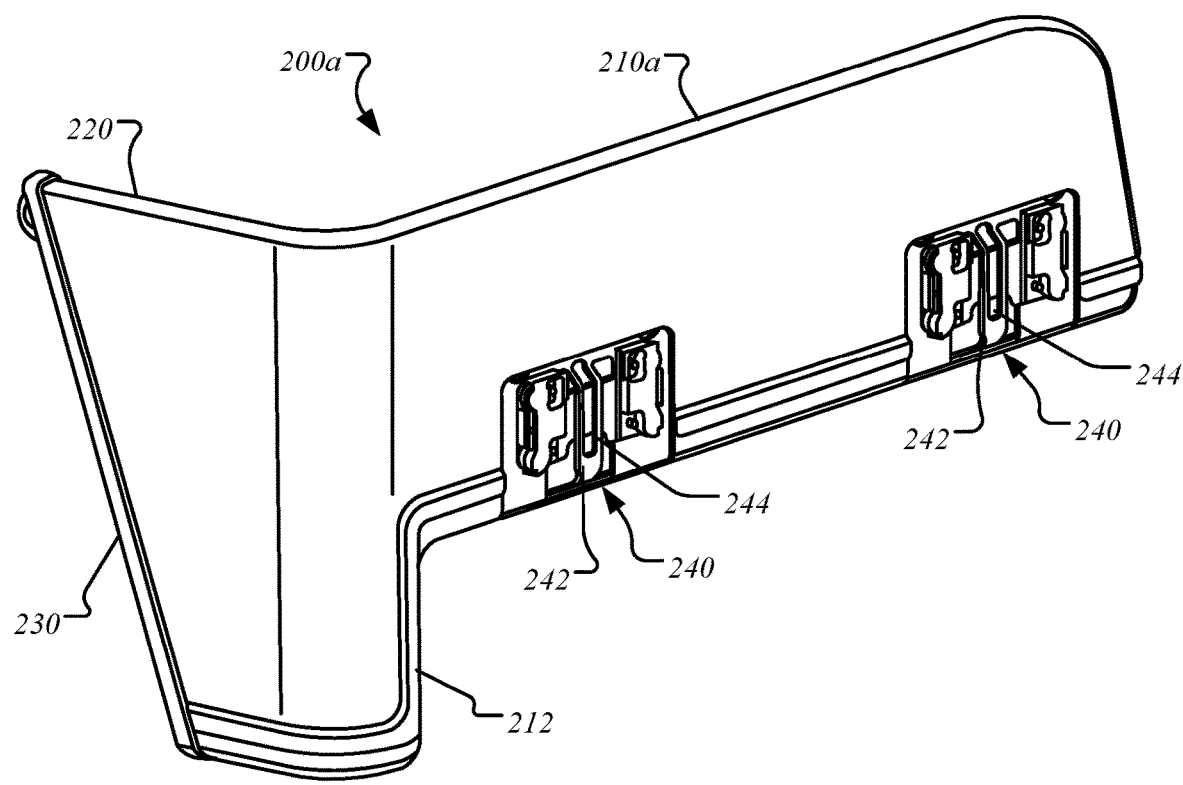
FIG. 2B is a rear perspective view of the privacy headrest assembly of FIG. 2A showing the headrest mount portion having attachment assemblies according to an example.

Turning to FIGS. 2A and 2B, an example privacy headrest assembly 200a can have a headrest mount portion 210a, a privacy extension portion 220, and a connecting portion 212 for connecting the headrest mount portion 210a to the privacy extension portion 220.

In some implementations, the headrest mount portion 210a extends a width of the passenger seat 100 and can be configured to move with the head cushion 112. The headrest mount portion 210a can have one or more attachment assemblies 240 configured to secure the privacy headrest assembly 200a to the seat frame 110 of the seat 100 according to an example.

In an example, the headrest mount portion 210a can provide structural support of the privacy headrest assembly 200a through connection to the seat frame 110 of the seat 100. The headrest mount portion 210a may also serve as a privacy barrier between a fore and aft seat. In an example, the headrest mount portion 210a can have a curved shape 214 on an end to complement a cabin wall and/or to conform to a shape of the seat 100.

Figure 2C:
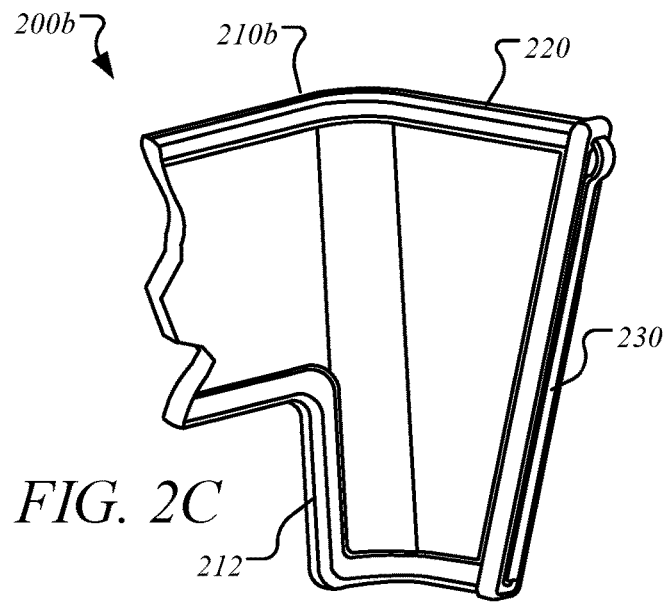
FIGS. 2C and 2D are perspective views of a privacy headrest assembly having a shortened headrest mount portion according to an example.
Figure 2D:
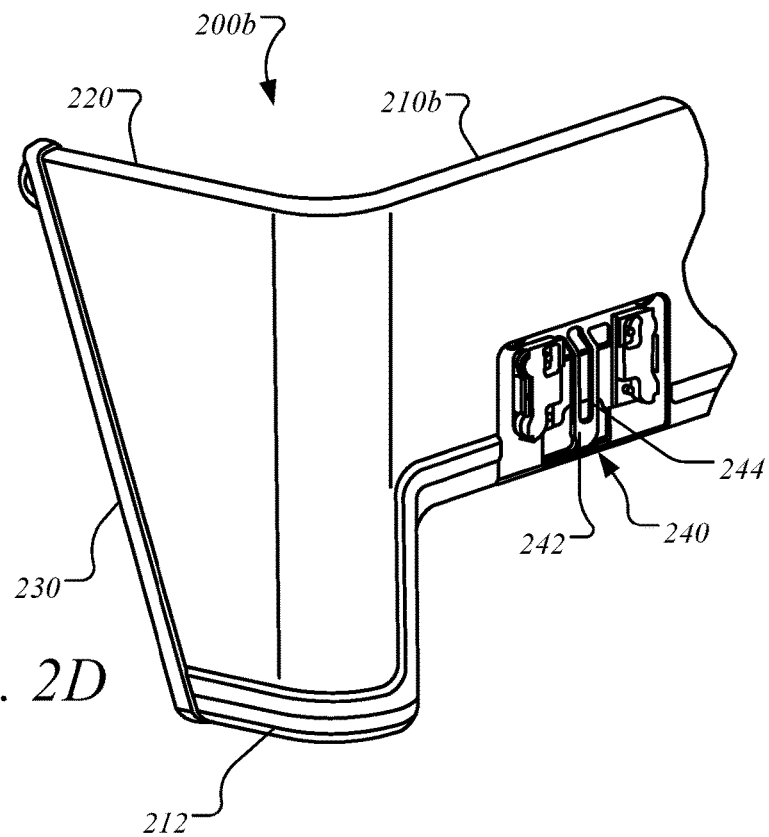

In other embodiments, for example as shown in FIGS. 2C and 2D, a privacy headrest assembly 200b can have a shortened headrest mount portion 210b that can be attached to a lateral edge of the seat frame 110. In this case, a headrest mount portion secured to a more central portion of the seat frame may not be necessary.

In an example, the connecting portion 212 can have a substantially similar width as the privacy extension portion 220. In an example, the connecting portion 212 can partially store a portion of a privacy shield (See FIG. 5A). In some implementations, the privacy extension portion 220 includes a privacy shield 230 configured to extend between the seat 100 and the adjacent seat 102. In some cases, a separation between two passenger seats can be substantial. In these circumstances, in some embodiments, the privacy headrest assembly 120 can be configured to provide privacy from (e.g., shield the view from and/or block light coming from) an aft-seated passenger. In an example, the connecting portion 212 can be configured to extend laterally from the headrest mount portion 210a-b to at least partially block the separation between the abutting passenger seats.

Figure 3A:
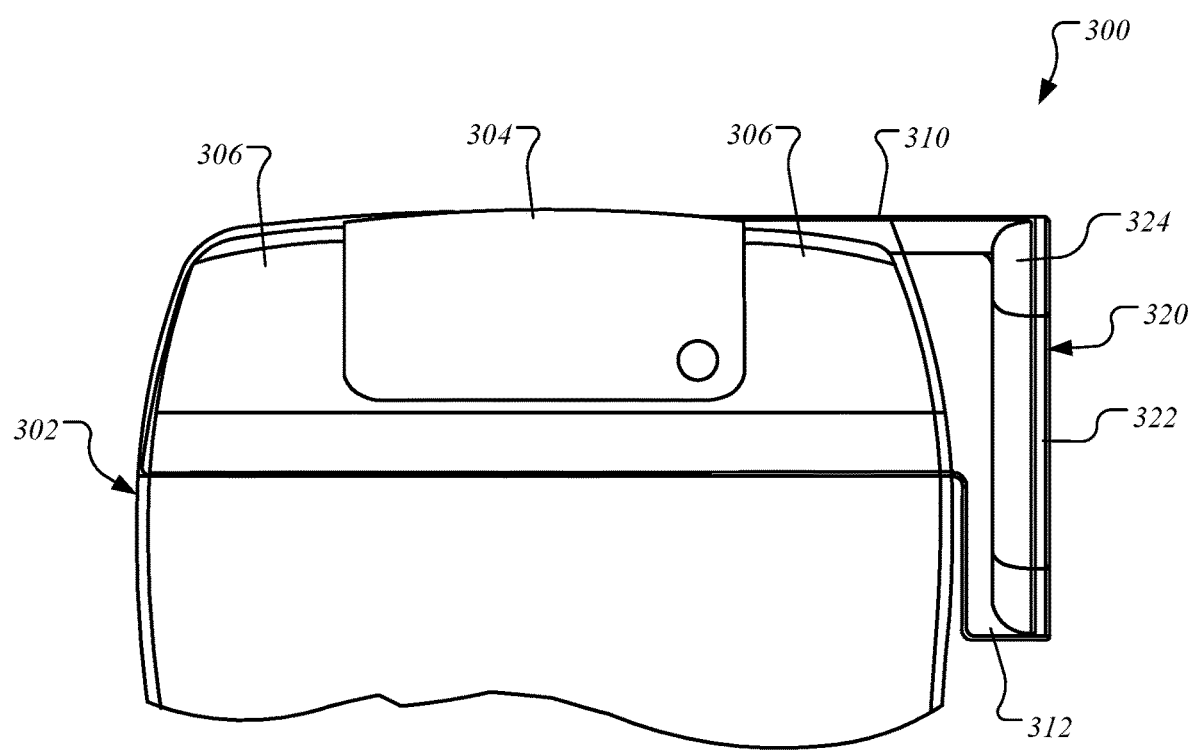
FIG. 3A is a front view of an upper portion of a passenger seat having a privacy headrest assembly according to an example.

FIG. 3A is a front view of an upper portion of a passenger seat 302 having a headrest 304 and a privacy headrest assembly 300 including a headrest mount portion 310, a connecting portion 312, and a privacy extension portion 320 according to an example. In some embodiments, a headrest such as the headrest 304 includes lateral adjustable sides 306 configured to bend forward (e.g., to use as a head rest when napping). To provide stability in the circumstances of a forward-adjustable headrest such as the headrest 304, the privacy extension portion 320 of the privacy headrest assembly 300 can have an outer shell 322 extending laterally behind the headrest 304 beyond the edges of the headrest 304, at least when the headrest 304 is adjusted such that one or both of the adjustable sides 306 is angled in the fore direction. In an example, the extension portion 320 can be configured to have a length longer than the lateral adjustable sides 306.

In other embodiments, rather than having forward adjustable sides 306, the privacy headrest assembly 300 includes an inner cushion 324 that may be used as a head and shoulder support while the seated passenger is resting. For example, the privacy extension portion 320 can be configured to be secured to the connecting portion 312 such that a weight of a passenger's head leaning against the privacy extension portion 320 can be supported. In some example, the privacy headrest assembly 300 may be designed to support a static load of at least 4 pounds, greater than 10 pounds, or up to up to 15 pounds. In one example, the inner cushion 324 is padded. In another example, the inner cushion 324 includes at least one inflatable bladder. For example, an amount of cushion and/or softness of cushion may be adjustable using an adjustable air bladder. The inner cushion 324 may be wrapped or covered in a material, such as leather or fabric.

Figure 3B:
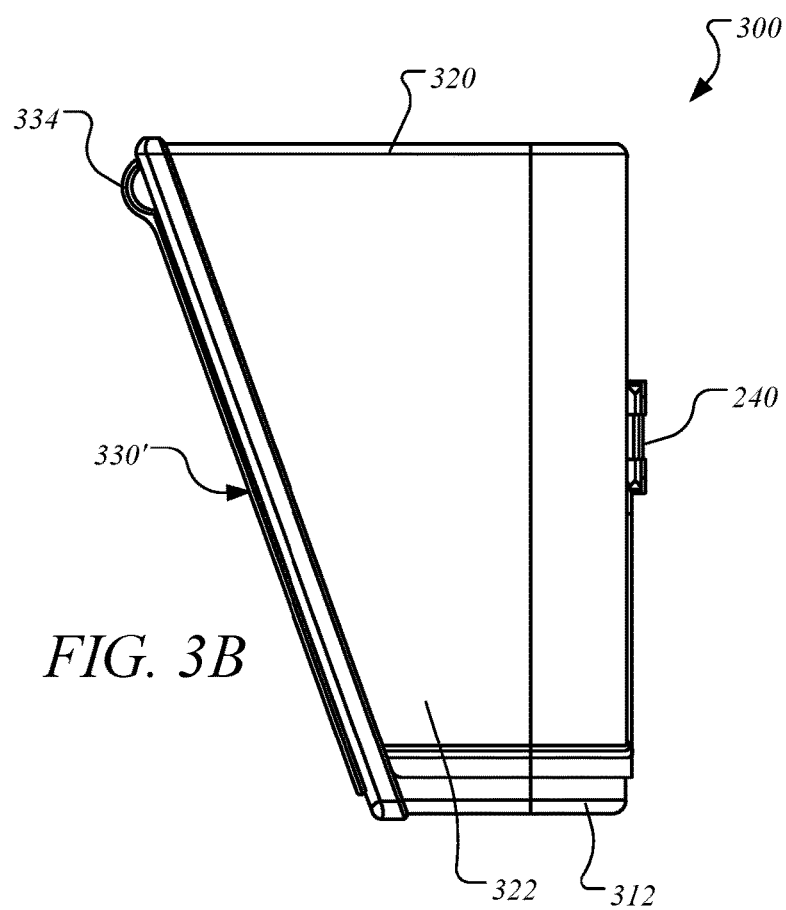
FIG. 3B is a side view of a privacy headrest assembly showing a privacy extension portion with a privacy shield stowed into the privacy extension portion according to an example.
Figure 3C:
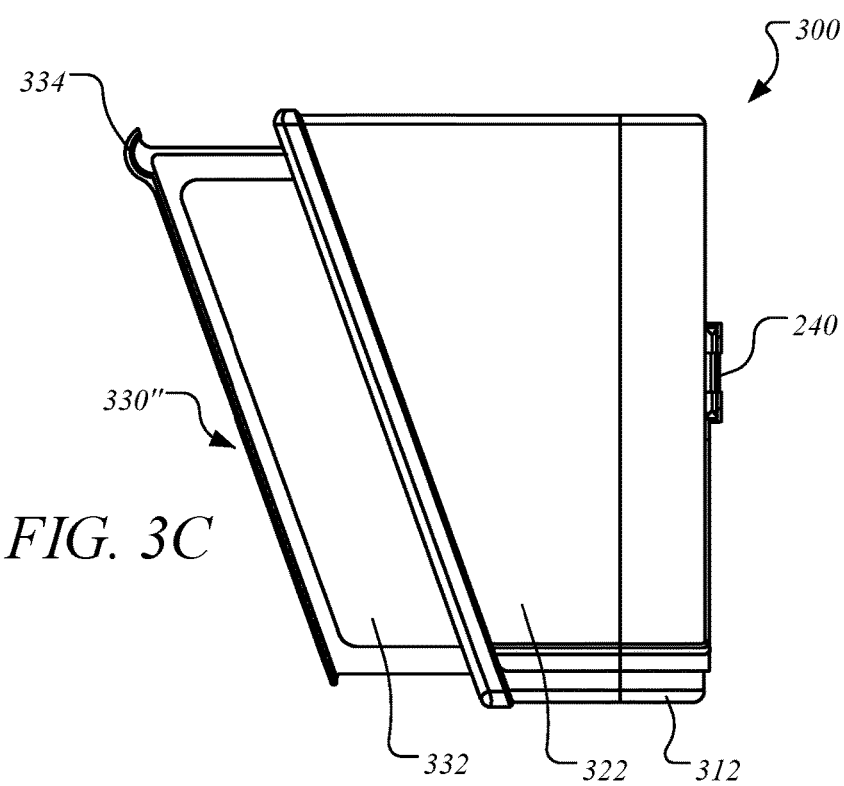
FIG. 3C is a side view of a privacy headrest assembly showing a privacy extension portion with the privacy shield extended from the privacy extension portion according to an example.

FIGS. 3B and 3C are side views of the privacy headrest assembly 300 showing the privacy extension portion 320 with a privacy shield 330 stowed into (330') and extended from (330") the privacy extension portion 320, respectively, according to an example. The privacy shield 330 can include an opaque screen 332 connected to a protrusion 334 configured to help extend the privacy shield 330 from the privacy extension portion 320. In an example, the privacy shield 330 can have an angled edge as shown. For example, the angled edge may allow greater visibility to the passenger while providing privacy to the passenger. In other embodiments, the privacy shield 330 includes a flat (e.g., vertical relative to a mount position) edge. For example, a flat edge may provide a greater amount of light blockage from lower held devices such as tablet computers, smart phones, and laptop computers of neighboring passengers. In a further example, the privacy shield 330 may include a curved edge, for example to reduce chance of injury from a small child bouncing upward and connecting with the edge of the privacy shield 330.

As shown in FIGS. 3B and 3C, the at least one attachment assembly 240 is shown extending from the headrest mount portion 310. In some embodiments, the privacy headrest assembly 300 is secured with an adjustable mount (not shown) such that the privacy headrest assembly 300 can be raised or lowered relative to the passenger seat 302. For example, depending upon a height of the passenger, the privacy headrest assembly 300 may be vertically adjustable.

In some embodiments, the headrest 304 is secured with an adjustable mount (not shown) such that the headrest 304 can be raised or lowered relative to the privacy headrest assembly 300 and/or the passenger seat 302. For example, the privacy headrest assembly 300 may be mountable on passenger seats having vertically adjustable headrests without the privacy headrest assembly 300 moving with the headrest 304. This may aid in avoiding blockage of visibility by cabin attendants by limiting a range of movement of the privacy headrest assembly 300. In other embodiments, the headrest assembly 300 is mounted to adjustably move with the headrest 304, for example for convenient height-adjustment relative to passenger height.

Figure 5A:
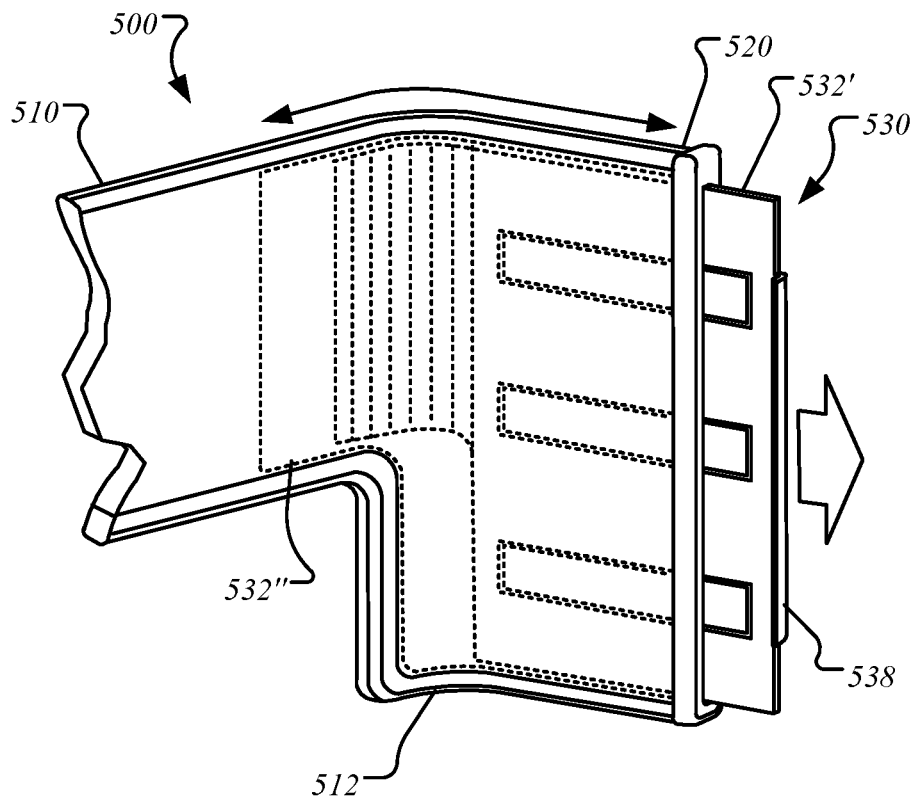
FIG. 5A is a front perspective view of a privacy extension portion having a semi-rigid retractable shield retractable into the privacy extension portion and the headrest mount portion according to an example.
Figure 6A:
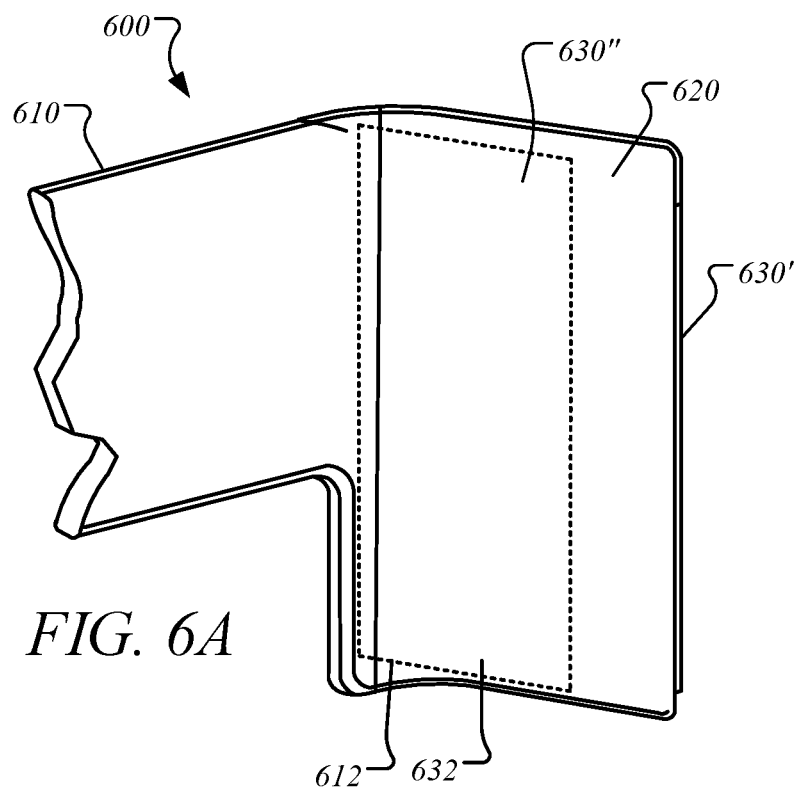
FIG. 6A-6B illustrates a front perspective view of a privacy headrest assembly having a privacy extension portion configured to extend from the headrest mount portion according to an example embodiment.
Figure 6B:
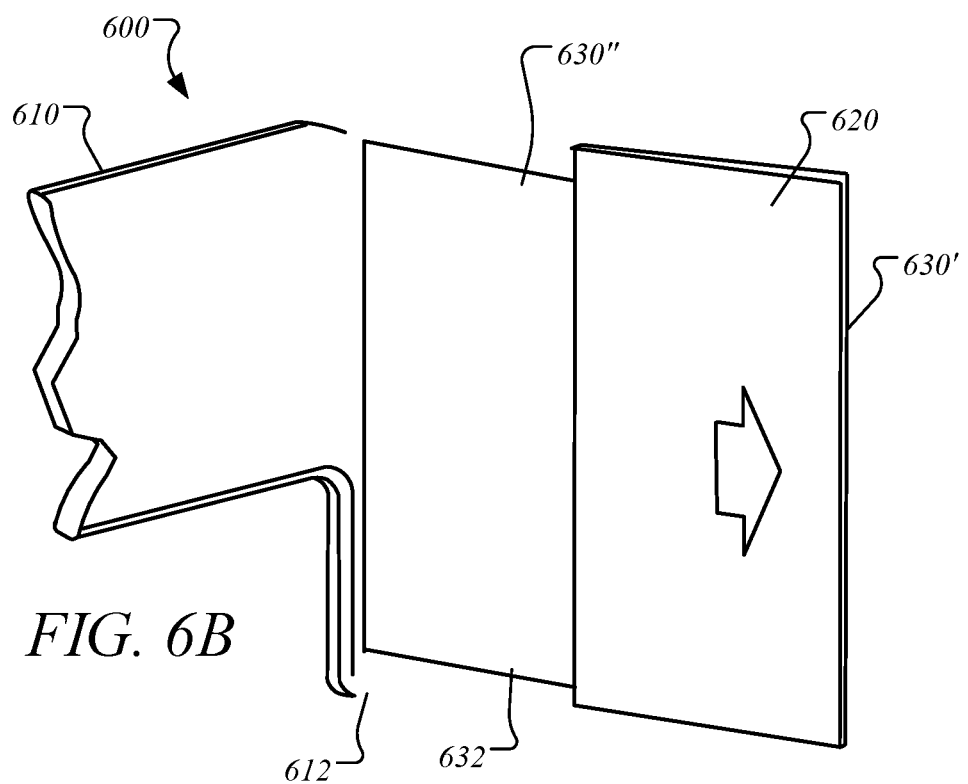
Figure 7:
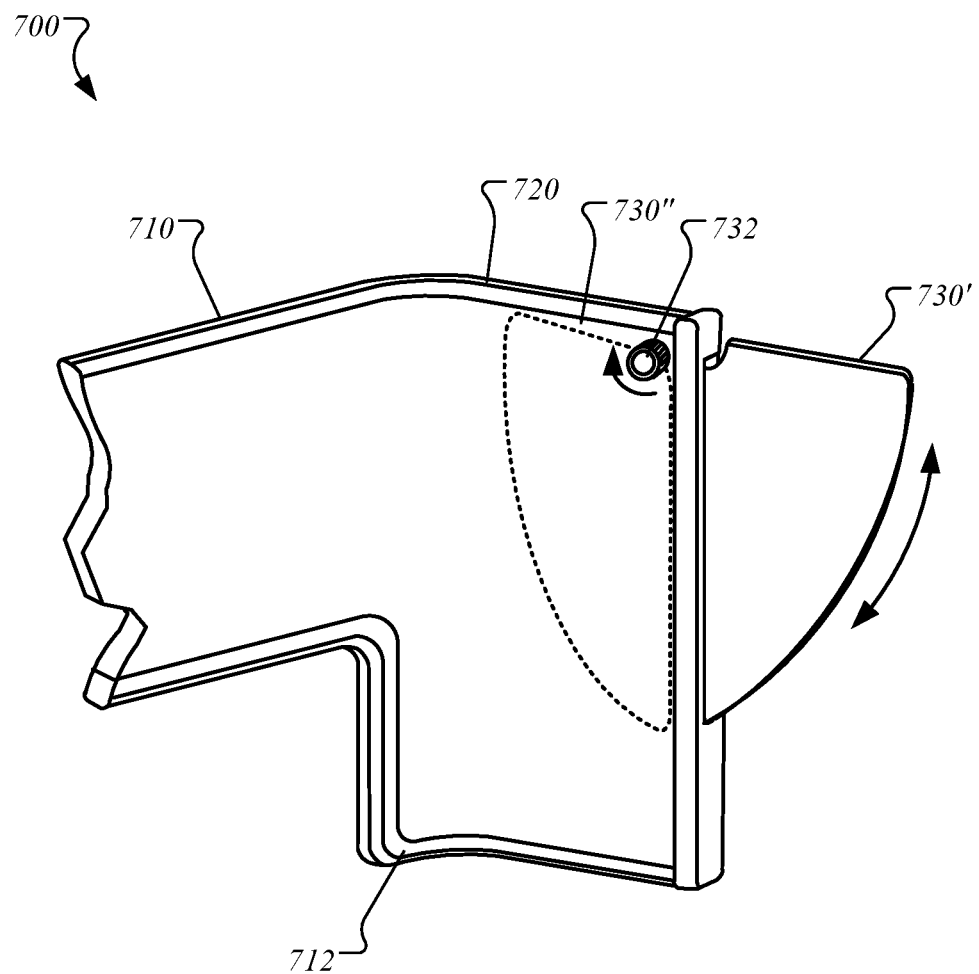
FIG. 7 is a front perspective view of a privacy extension portion having a pivoted blind configured to rotate into and out of the privacy extension portion according to an example.

A privacy headrest assembly can be configured to extend a privacy shield in several ways. In an example, the privacy shield can be a sliding rigid shield (FIG. 4A), sliding semi-rigid shield (FIG. 5A), and a rotating opaque screen (FIG. 7). In other implementations, a privacy headrest assembly can have a movable privacy extension portion that is configured to expose a privacy screen (FIGS. 6A-6B).

Figure 4A:
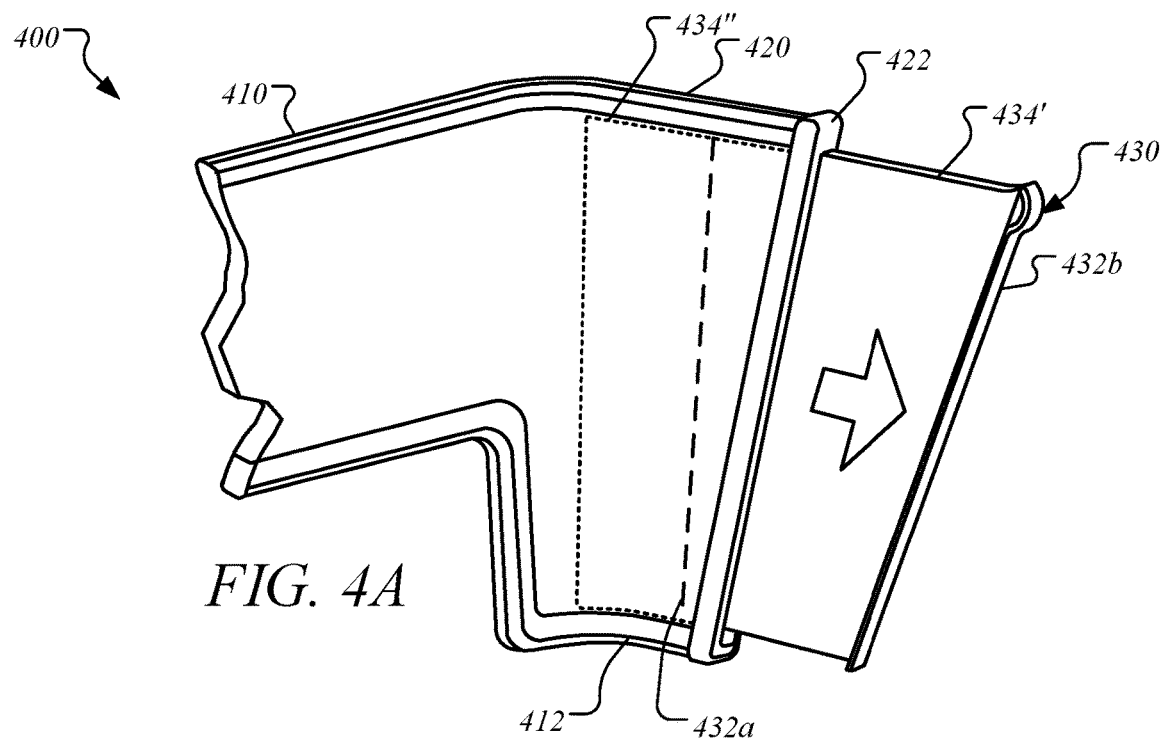
FIG. 4A is a front perspective view of a privacy extension portion having a rigid shield retractable into the privacy extension portion according to an example.

In some implementations, as shown in FIG. 4A, a privacy headrest assembly 400 can include a headrest mount portion 410 and a privacy extension portion 420 connected by a connecting portion 412, and a sliding rigid shield 430 having an opaque screen 434. A privacy headrest assembly can be configured to store and extend a privacy shield in several ways.

Figure 4B:
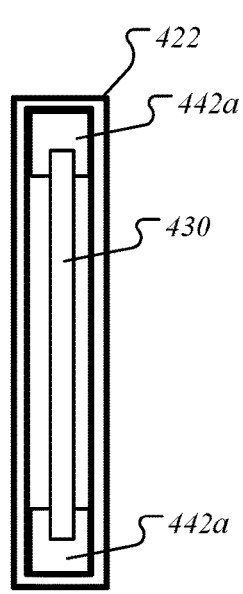
FIG. 4B illustrates an end of a privacy extension portion having a housing, a track, and a sliding rigid shield configured to slide into and out of the track and the housing according to an example.

In an example, a privacy headrest assembly 400 can include a privacy extension portion 420 having a housing 422, at least one track 442a, and a sliding rigid shield 430 configured to slide into (434") and out of (434') the at least one track 442a and the housing 422 (FIG. 4B). In this case, the opaque screen 434 of the sliding rigid shield 430 is housed within the housing 422 of the privacy extension portion 420.

Figure 4C:
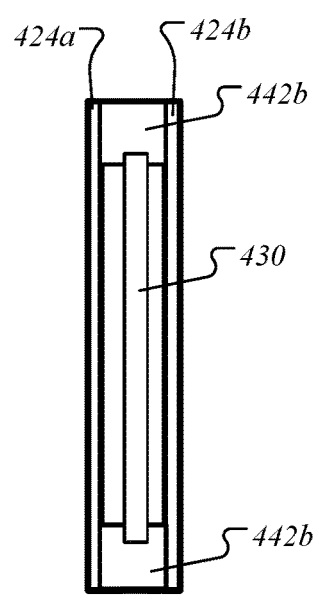
FIG. 4C illustrates an end of a privacy extension portion including a first shell, a second shell, a track configured to form a gap between the first shell and the second shell, and a sliding rigid shield configured to slide into and out the gap between the first shell and the second shell according to an example.
Figure 4D:
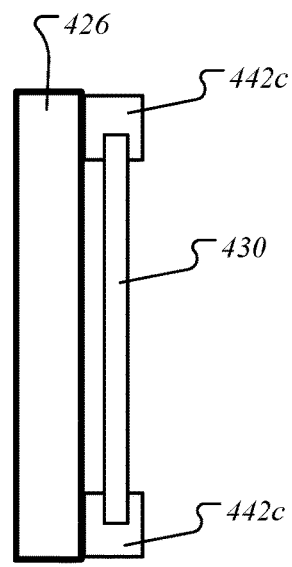
FIG. 4D illustrates an end of a privacy extension portion including a support, a track attached to a surface along a length of the support, a sliding rigid shield configured to move along the track adjacent to the privacy extension portion according to an example.
Figure 4E:
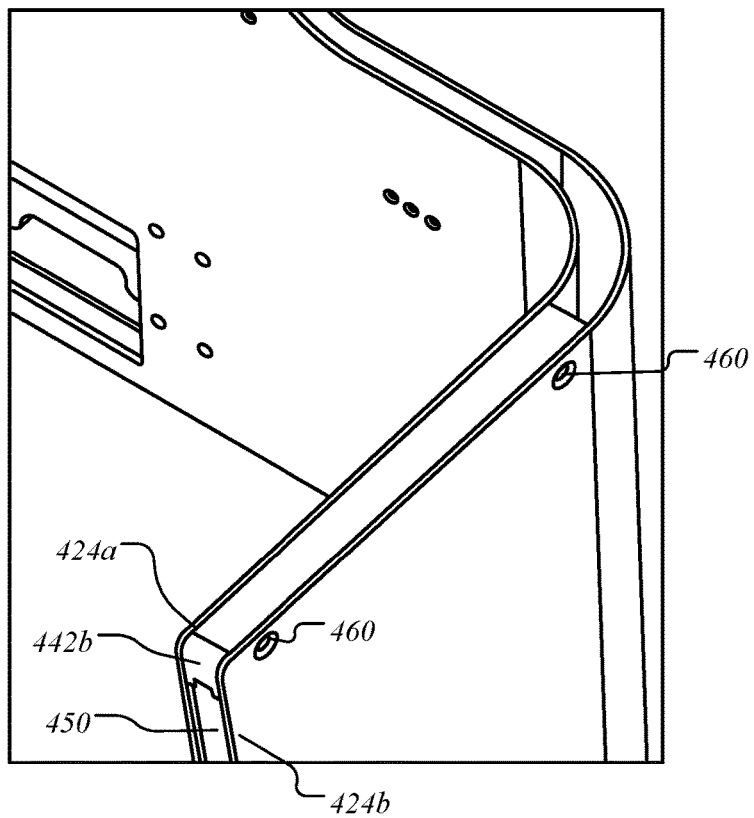
FIG. 4E illustrates a perspective view of a privacy headrest assembly including a first shell, a second shell, a track configured to form a gap between the first shell and the second shell according to an example.
Figure 4F:
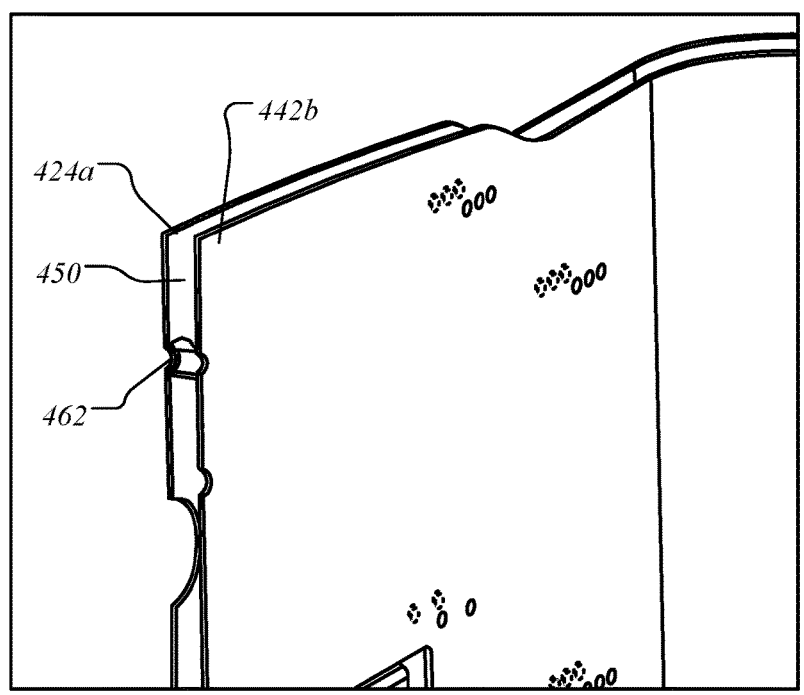
FIG. 4F illustrates a left perspective view of a portion of the privacy headrest assembly in FIG. 4E including a number of spacers configured to support the gap between the first shell and the second shell according to an example.

In an example, a privacy extension portion 420 can include a first shell 424a, a second shell 424b, at least one track 442b configured to form a gap 450 between the first shell 424a and the second shell 424b, where the sliding rigid shield 430 can be configured to slide into and out of the at least one track 442b and the gap 450 between the first shell 424a and the second shell 424b (FIG. 4C). In this example, the at least one track 442b serves as part of a structural support when secured to the first shell 424a and the second shell 424b. FIG. 4E illustrates a perspective view of a privacy headrest assembly including the first shell 424a, the second shell 424b, a track 442b configured to form a gap 450 between the first shell 424a and the second shell 424b according to an example. The track 442b can be secured to the first shell 424a and the second shell 424b at either side of the track 442b according to an example. In another example, the track 442b can have pass-through apertures such that the first shell 424a can be directly coupled to the second shell 424b. In an example, the privacy headrest assembly can include a number of spacers 462 configured to support the gap 450 between the first shell 424a and the second shell 424b (see FIG. 4F). In an aspect, each spacer 460 can function to provide structural support to the privacy headrest assembly by securing the first shell 424a to the second shell 424b in addition to maintaining the gap 450.

In another example, a privacy extension portion 420 can include a support 426 and at least one track 442c attached to a surface and along a length of the support 426. The sliding rigid shield 430 is and configured to move along the at least one track 442c adjacent to the privacy extension portion 420 (FIG. 4D). In an example, the at least one track 442c can have a rail, ledge, trim, and/or grip configured to support and guide the sliding rigid shield 430. In another example, a top track and a bottom track can be used to support and guide a top portion and a bottom portion of the sliding rigid shield 430.

In an example, the opaque screen 434 can have a first bumper 432a on a first end of the opaque screen 434 that is within the privacy extension portion 420 such that the opaque screen 434 is prevented from fully being removed. Likewise, the opaque screen 434 can have a second bumper 432b on a second end of the opaque screen 434 that is wider than the housing 422 of the privacy extension portion 420 of the privacy extension portion 420 such that the opaque screen 434 is prevented from being inaccessible. In an example, the second bumper 432b can be configured to serve as a handle for gripping by a passenger to pull the sliding rigid shield 430. Alternatively, in an example, the sliding rigid shield 430 can be flush with the housing 422 of the privacy extension portion 420 and can operate similar to a spring-loaded pocket door. During use, when a passenger presses the sliding rigid shield 430 into the housing 422 the sliding rigid shield 430 is configured to pop out. During stowage, when the passenger presses the sliding rigid shield 430 back into the housing 422 the sliding rigid shield 430 is configured to remain flush.

Materials used in the sliding rigid shield 430 can include injection molded plastics according to an example. In some implementations, the sliding rigid shield 430 can further include a quiet close mechanism (not shown) configured to gently close back into the privacy extension portion 420 with minimal effort.

In some implementations, a privacy headrest assembly can include a sliding semi-rigid shield configured to slide into and out of a privacy extension portion. As shown in FIG. 5A, in an example, a privacy headrest assembly 500 can include a headrest mount portion 510, a connecting portion 512, and a privacy extension portion 520 having a sliding semi-rigid shield 530. In an example, the sliding semi-rigid shield 530 is configured to slide into and out of the privacy extension portion 520 and at least a portion of the connecting portion 512. In another example, the sliding semi-rigid shield 530 is configured to slide into and out of the privacy extension portion 520, the connecting portion 512, and at least a portion of the headrest mount portion 510.

In an example, the sliding semi-rigid shield 530 can include a first portion 532' connected to a second portion 532". In an example, the first portion 532' of the sliding semi-rigid shield 530 can be semi-rigid by having a plurality of vertical corrugations 534a to aid in bending. In an example, the first portion 532' of the sliding semi-rigid shield 530 can be semi-rigid by having a plurality of horizontal ribs 534b to aid in providing rigidity. Materials used in the sliding semi-rigid shield 530, in some examples, can be made from thermoplastic acrylic-polyvinyl chloride material or acrylic polyvinyl chloride material. In an example, the plurality of vertical corrugations 534a and the plurality of horizontal ribs 534b can be pressure formed, molded, or reinforced using one or more harder materials.

Figure 5B:
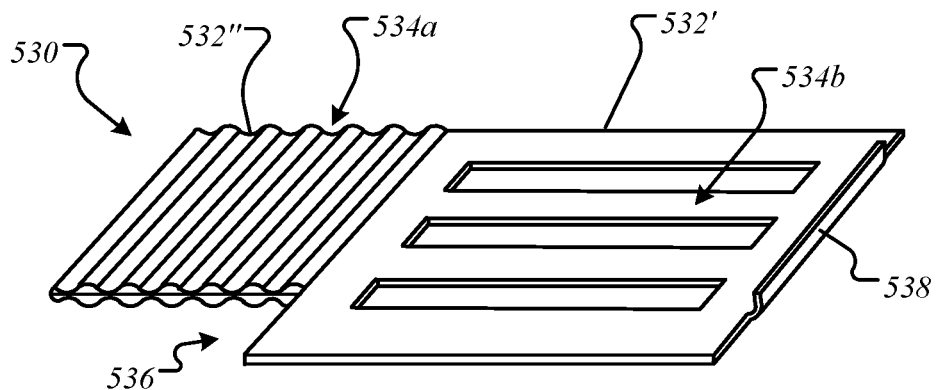
FIG. 5B is a perspective view of the semi-rigid retractable shield of FIG. 5A according to an example.

In an example, the sliding semi-rigid shield 530 can have a complementary shape 536 on an end within the headrest mount portion 510 (See FIG. 5B). In an example, the complementary shape 536 is configured to complement a shape of the connecting portion 512 and/or the headrest mount portion 510. The sliding semi-rigid shield 530 can have a flange or a lip 538 configured to provide a handle and prevent the sliding semi-rigid shield 530 from entirely moving into the privacy extension portion 520. In another example, the complementary shape 536 of the sliding semi-rigid shield 530 can be configured to stop against the connecting portion 512 and prevent the sliding semi-rigid shield 530 from entirely moving into the privacy extension portion 520. In some implementations, the sliding semi-rigid shield 530 can further include a quiet close mechanism (not shown) configured to gently close back into the privacy extension portion 520 with minimal effort. In an example, the plurality of horizontal ribs 534b of the first portion 532' can have shape memory and/or be spring loaded to aid in retracting the sliding semi-rigid shield 530 back into the privacy extension portion 520.

In some implementations, a privacy headrest assembly can include an extending portion configured to extend from a connecting portion and reveal an opaque screen. As shown in FIGS. 6A-6B, a privacy headrest assembly 600 can include a headrest mount portion 610, a connecting portion 612, and a privacy extension portion 620 having an extending portion 630 according to an example. The extending portion 630 can be collapsed in a first position (FIG. 6A) when not in use and extended into a second position (FIG. 6B) when in use. In an example, the extending portion 630 can be configured to reveal an opaque screen 632 when extended. In some implementations, the opaque screen 632 can be rigid and/or reinforced, and configured to support the extending portion 630. In some implementations, the extending portion 630 can further include a quiet close mechanism (not shown) configured to gently close back into the first position with minimal effort.

In some implementations, a privacy headrest assembly includes a rotating opaque screen configured to rotate into and out from a privacy extension portion. As shown in FIG. 7, a privacy headrest assembly 700 can include a headrest mount portion 710, a connecting portion 712, and a privacy extension portion 720 having a rotating opaque screen 730 according to an example. In an example, a rotation of a knob 732 in communication with the rotating opaque screen 460 can be configured to store the rotating opaque screen 730 into (730") and out of (730') the privacy extension portion 720. In some implementations, the rotating opaque screen 730 can be made from a rigid material. In other implementations, the rotating opaque screen 730 can be made from an expanding or folded material that is configured to expand with rotation of the knob 732. In some implementations, the rotating opaque screen 730 can further include a quiet close mechanism (not shown) configured to gently close back into the privacy extension portion 720 with minimal effort.

Figure 8A:
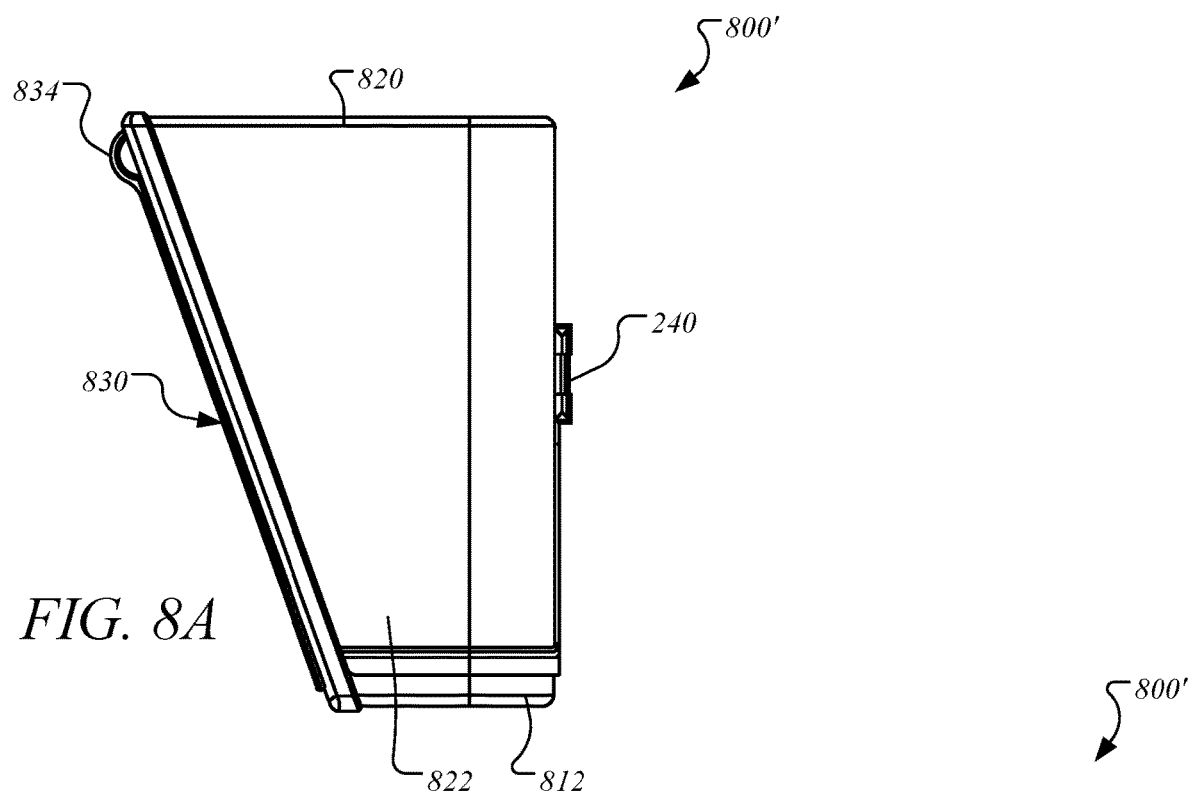
FIGS. 8A-8B illustrate a privacy headrest assembly 800 including a privacy extension portion configured to move vertically from a connecting portion according to an example embodiment.
Figure 8B:
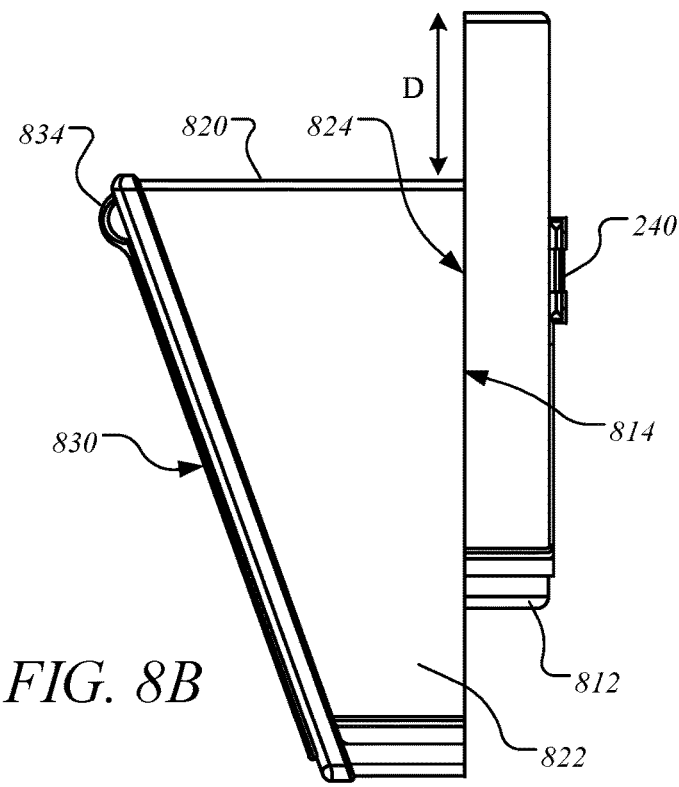

In some implementations, a privacy headrest assembly includes a privacy extension portion configured to move vertically with respect to a connecting portion along a vertical adjustment member. FIGS. 8A-8B illustrate a privacy headrest assembly 800 including a privacy extension portion 820 configured to move vertically from a connecting portion 812 according to an example. FIGS. 8A and 8B show the privacy extension portion 820 in line with the connecting portion 812 (800') and displaced (800") from the connecting portion 812 respectfully according to an example. In an example, the privacy headrest assembly 800 can include a vertical rail 824 configured to connect the privacy extension portion 820 to the connecting portion 812, while still allowing vertical translation. In another example, a vertical guide member or track may connect the privacy extension portion 820 to the connecting portion 812. The vertical adjustment member, in some embodiments, is universally adjustable to any vertical position along the vertical adjustment member. For example, a friction connection between the privacy extension portion 820 and the connecting portion 812 may provide the opportunity for universal adjustment along the vertical rail 824. In another example, the extension interface 824 and the connecting portion interface 814 can utilize a channel and a roller system (not shown) configured to allow the privacy extension portion 820 to move relative to the connecting portion 812 at any increment along a distance D. In other embodiments, the vertical adjustment member allows vertical adjustment to one of a number of selectable adjustment heights. For example, a vertical track may include selectable depressions or extensions mating with a corresponding guide member of the privacy extension portion 820 for selectably configuring a height of the privacy extension portion 820. In an example, the privacy extension portion 820 can have an extension interface 824 be configured to move up above a connecting portion interface 814 of the connecting portion 812. In an example, the privacy extension portion 820 can have an extension interface 824 be configured to move down below the connecting portion interface 814 of the connecting portion 812.

In some implementations, the privacy shield includes a grasping member for aiding a passenger in moving the privacy shield between the stowed position and a selected deployed position. For example, as illustrated in FIGS. 8A-B, the privacy shield 830 includes a protrusion 834 configured to help extend the privacy shield 830 from the privacy extension portion 820. In another example, the privacy shield may include a finger depression to aid in grasping. In a further example, the privacy shield may include a small open handle region for linking one or more fingers through in pulling the privacy shield 830 into an extended position.

In other implementations, the privacy shield is spring-deployable and includes a spring deployment member for releasing the privacy shield to the deployed position. For example, the user may depress a button to release the privacy shield from the stowed position. In another example, the user may push back upon the privacy shield to release a locking mechanism and deploy the spring-loaded privacy shield. The privacy shield, upon spring deployment, may extend only a portion of the way to a fully extended position. For example, upon spring deployment, the privacy shield may be configured to move forwards far enough to provide the passenger with a surface for grasping (e.g., at least a quarter inch, about a half inch, or up to three inches) to continue to extend the privacy shield into the fully deployed position.

Turning to FIGS. 9A-9C and 10A-10B, a method of assembling a privacy headrest assembly to a passenger seat having a seat frame using one or more brackets is provided. In an aspect, the seat frame can be an existing seat frame as currently used and the one or more brackets can be adapted to match existing hardware locations of the existing seat frame. Being able to use existing seat frames is an advantage over requiring a custom seat frame to use the privacy headrest assembly.

Figure 9A:
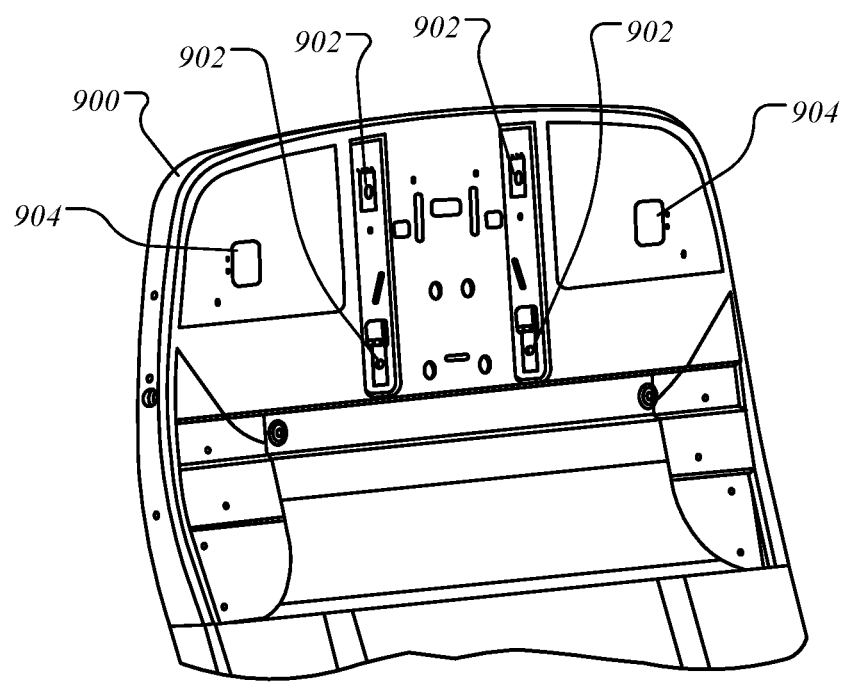
FIG. 9A is a front perspective view of an upper portion of a seat frame according to an example.
Figure 9B:
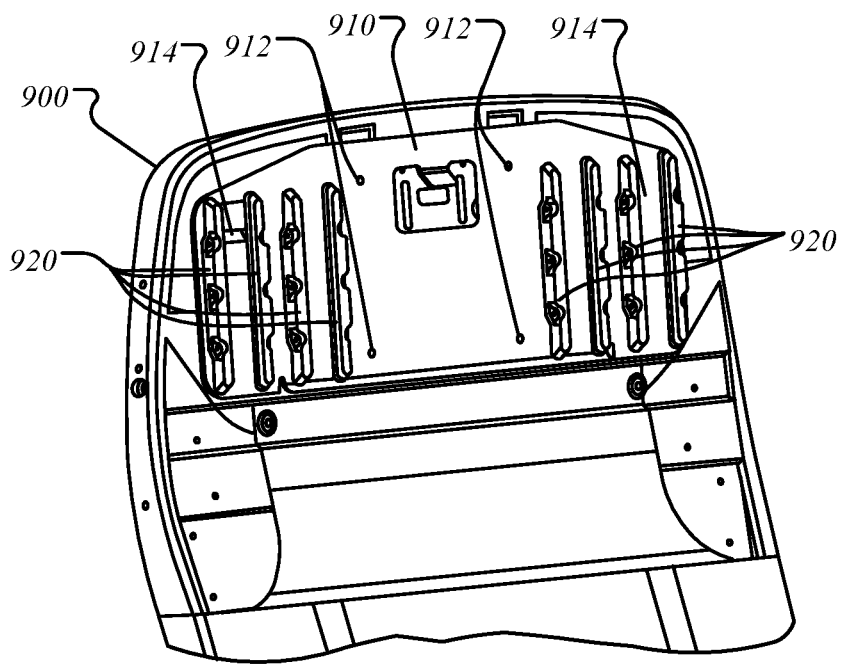
FIG. 9B is a front perspective view of the upper portion of the seat frame of FIG. 9A including a first bracket plate having a plurality of spacers according to an example.

FIG. 9A is a front perspective view of an upper portion of a seat frame 900 having a plurality of first apertures 902 and a plurality of second apertures 904 according to an example. In an example, the plurality of first apertures 902 located in an arrangement in a central portion of the upper portion of the seat frame 900. In an example, the plurality of first apertures 902 and the plurality of second apertures 904 can be part of an existing seat frame. In an example, the method can include providing a first bracket plate 910, mounting the first bracket plate 910 to the seat frame 900 by aligning a plurality of lips 914 of the first bracket plate 910 into the plurality of second apertures 904 of the seat frame 900 (see FIG. 10B), and securing with a plurality of screws (not shown) at a plurality of securing apertures 912 corresponding spatially with the plurality of first apertures 902 of the seat frame 900 (see FIG. 9B). In an example, the first bracket plate 910 can further include a plurality of spacers 920 which protrude from a surface of the first bracket plate 910. In an example, a second bracket 930 having a plurality of apertures 932 can be attached to the plurality of spacers 920 secured on the first bracket plate 910 (see FIG. 9C). The second bracket 930 can further have at least one mounting bracket 940 complementing the at least one attachment assembly 240 of the headrest mount portion 210 according to an example (See FIG. 2B).

Figure 9C:
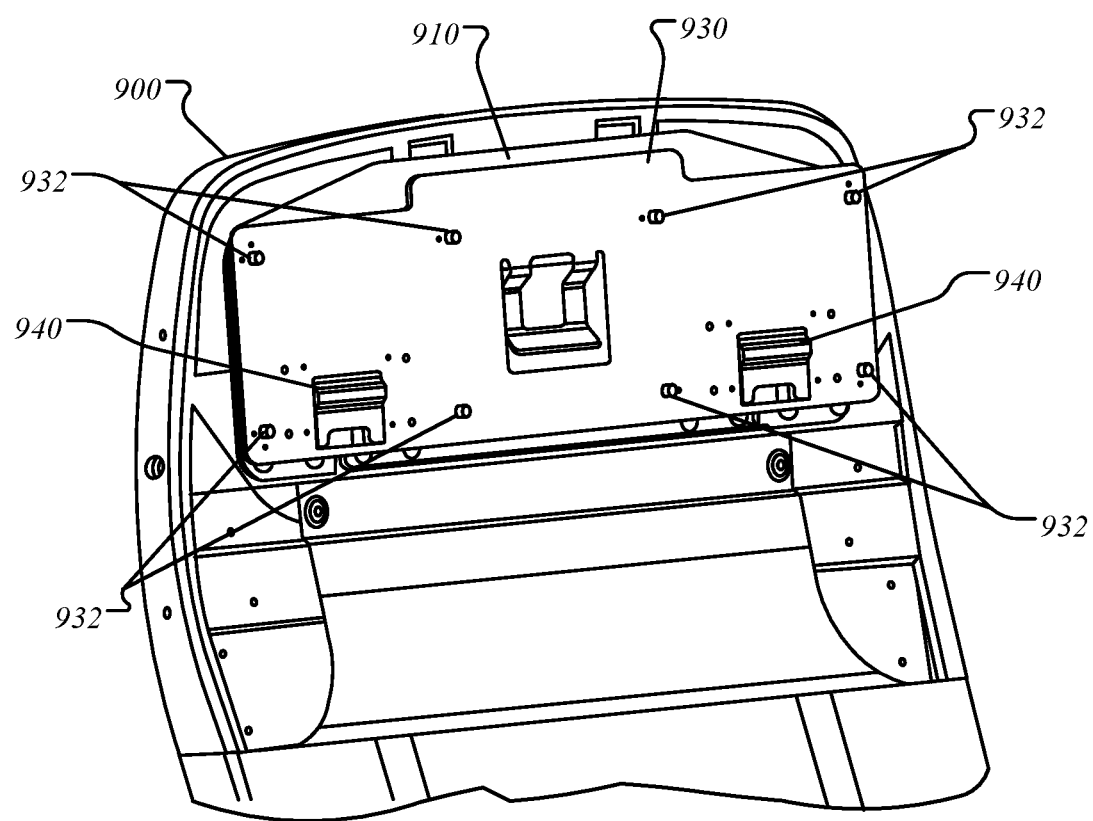
FIG. 9C is a front perspective view of the upper portion of the seat frame of FIG. 9B including a second bracket plate attached to the first bracket plate and having at one or more mounting brackets complementing the one or more attachment assemblies of the headrest mount portion according to an example.
Figure 10A:
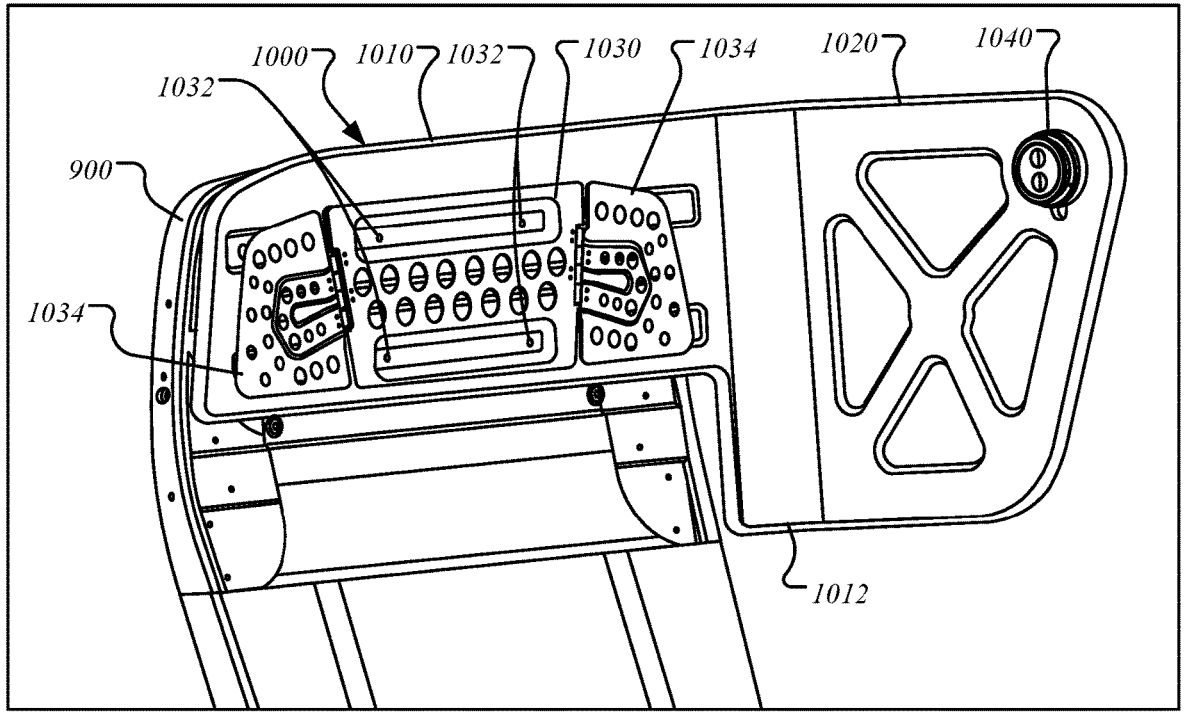
FIG. 10A is a front perspective view of the upper portion of the seat frame of FIG. 9C including a privacy headrest assembly secured to the seat frame using a head cushion frame according to an example.
Figure 10B:
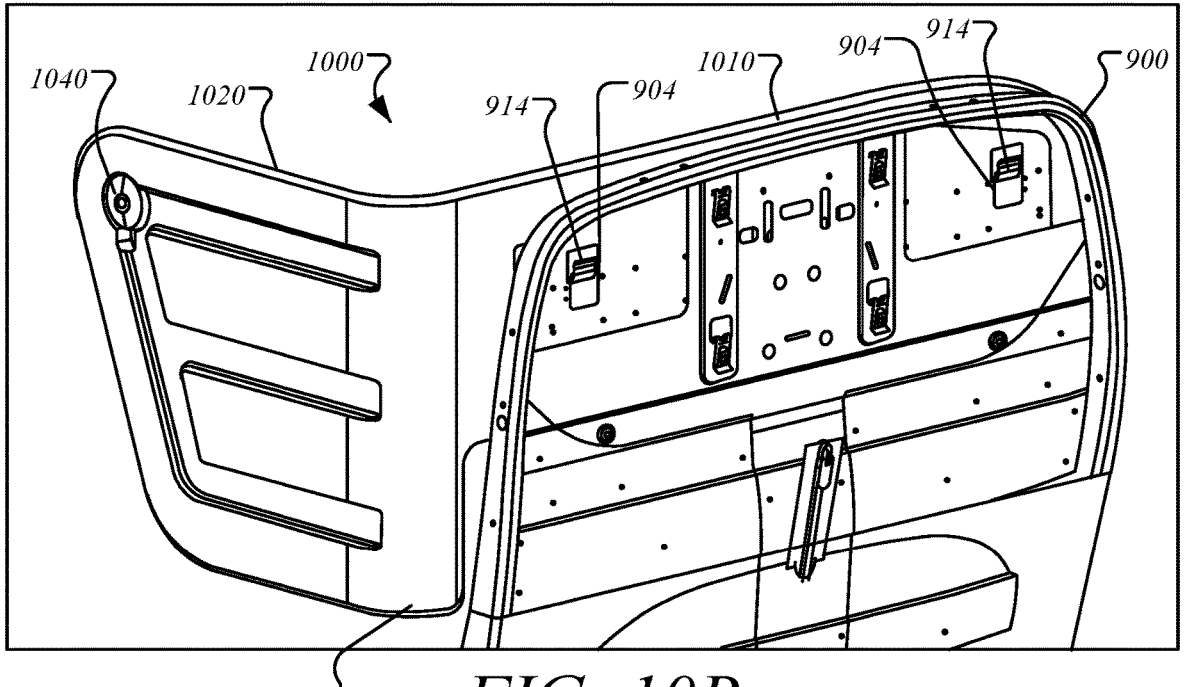
FIG. 10B is a back perspective view of the upper portion of the seat frame of FIG. 10A according to an example.
Figure 11A:
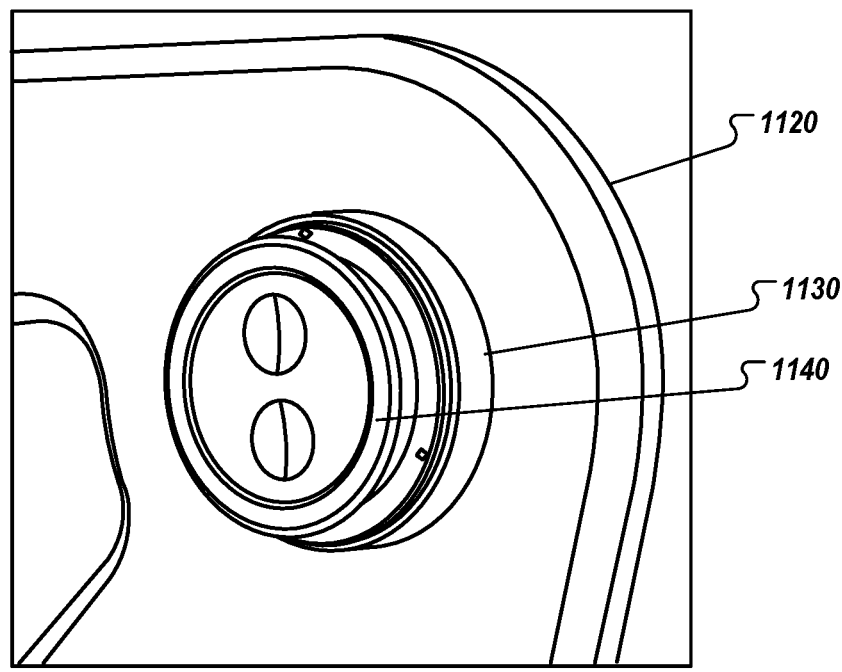
FIGS. 11A-11B illustrate a partial view of a privacy extension portion including a light frame having a number of securing apertures and a central aperture, and a light configured to fit within the central aperture according to an example.
Figure 11B:
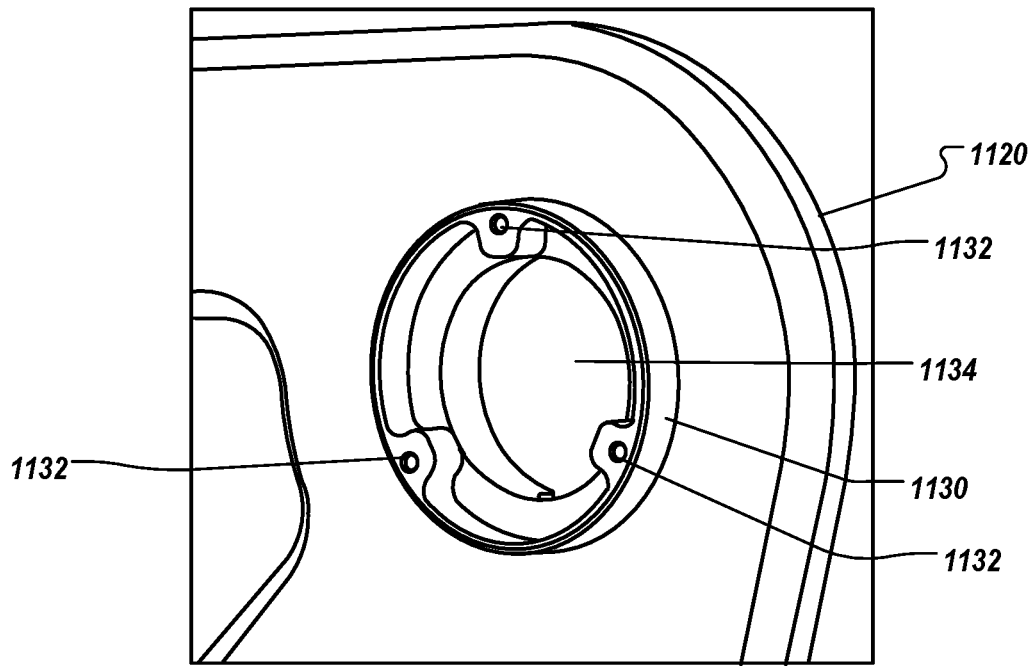

FIGS. 10A and 10B illustrate the upper portion of the seat frame 900 of FIG. 9C and a privacy headrest assembly 1000 secured to the second bracket 930. In an example, the privacy headrest assembly 1000 can have a headrest mount portion 1010, a privacy extension portion 1020, and a connecting portion 1012 for connecting the headrest mount portion 1010 to the privacy extension portion 1020 according to an example. In some implementations, the privacy headrest assembly 1000 can include a light 1040 positioned on the privacy extension portion 1020. As shown in FIGS. 11A-11B, a privacy extension portion 1120 can include a light frame 1130 having a number of securing apertures 1132 and a central aperture 1134. In an example, a light 1140 can be configured to fit within the central aperture 1134 and secured to the number of securing apertures 1132.

In an example, the privacy headrest assembly 1000 can be secured to the second bracket 930 using a head cushion frame 1030 and screws through a plurality of apertures 1032 according to an example. In an example, the head cushion frame 1030 can be configured to support the headrest 304, as well as lateral adjustable sides 1034 configured to support the adjustable sides 306 as shown in FIG. 3A. As discussed related to FIGS. 3B and 3C, in another example, the head cushion frame 1030 can be secured with the adjustable mount (not shown) such that the head cushion frame 1030 can be raised or lowered relative to the privacy headrest assembly 1000.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A privacy headrest assembly configured to provide privacy to a passenger seat, the privacy headrest assembly comprising:
   a laterally extending mount portion positionable between a forward-facing side of an upper portion of a seat frame and a rearward-facing side of a headrest forward of the seat frame;
   an attachment assembly connected to a rearward side of the laterally extending mount portion, the attachment assembly attachable to a complementing mounting bracket secured to the forward facing side of the upper portion of the seat frame;
   a privacy extension portion connected to a lateral end of the mount portion and extending forward therefrom for extending forward beyond a forward-facing side of the headrest, the privacy extension portion including a first shell and a second shell;
   a privacy shield slideably connected to the privacy extension portion to deploy in a forward direction from a stowed position to an operational position, wherein:
   in the stowed position, the privacy shield is substantially enclosed within the privacy extension portion between the first shell and the second shell; and
   in the operational position, at least a portion of the privacy shield is disposed forward of the privacy extension portion.

2. The privacy headrest assembly of claim 1, further comprising a track by which the privacy shield is slideably connected to the privacy extension portion, wherein the track includes a horizontal rail positioned along the privacy extension portion and configured to support and guide the privacy shield.

3. The privacy headrest assembly of claim 1, wherein the privacy shield is rigidly formed.

4. The privacy headrest assembly of claim 1, further comprising a connecting portion connecting the headrest mount portion to the privacy extension portion.

5. The privacy headrest assembly of claim 4, wherein, in the stowed position, the privacy shield is disposed in part in a portion of the connecting portion.

6. An aircraft passenger seat, comprising:
   a seat frame having a forward side;
   a mounting bracket secured to the forward side of the seat frame;
   a headrest mounted on the seat frame; and
   a privacy headrest extension assembly comprising: a mount portion having a rearward side and an attachment assembly connected to the rearward side, the attachment assembly attached to the mounting bracket such that the mount portion is positioned at least partially between the forward side of the seat frame and the head rest, the mount portion extending laterally from at least one lateral side of the headrest, a privacy extension portion connected to a lateral end of the mount portion and extending forward therefrom beyond a forward side of the headrest, the privacy extension portion including a first shell and a second shell, and a privacy shield slideably connected to the privacy extension portion to deploy in a forward direction from a stowed position to an operational position, wherein:
   in the stowed position, the privacy shield is substantially enclosed within the privacy extension portion between the first shell and the second shell; and
   in the operational position, at least a portion of the privacy shield is disposed forward of the privacy extension portion.

7. The aircraft passenger seat of claim 6, wherein the privacy extension portion extends in part substantially perpendicular from a lateral axis of the headrest, wherein at least one of the privacy extension portion a and a portion of the privacy shield comprises a padded surface, and wherein the privacy headrest extension assembly is configured to support up to 15 pounds of static load.

8. The aircraft passenger seat of claim 7, wherein:
a connection portion of the privacy headrest extension assembly connects the mount portion to the privacy extension portion;
the connection portion extends in part substantially in line with the lateral axis of the headrest and curves around to a perpendicularly-extending portion; and
at least a portion of the privacy shield is flexible such that the portion of the privacy shield is configured to stow within a curved portion of the connection portion.

9. The aircraft passenger seat of claim 6, wherein the privacy headrest extension assembly comprises a reading light.

10. The aircraft passenger seat of claim 6, wherein the attachment assembly is releasably attached to the mounting bracket.

* * * * *